(12) United States Patent
Snowdon

(10) Patent No.: US 6,709,217 B1
(45) Date of Patent: Mar. 23, 2004

(54) METHOD OF PNEUMATICALLY CONVEYING NON-FREE FLOWING PASTE

(75) Inventor: Brian Snowdon, Doncaster (GB)

(73) Assignees: CleanCut Technologies Limited, Edinborough (GB); Inbulk Technologies Limited, Glasgow (GB)

( * ) Notice: Subject to any disclaimer, the term of this patent is extended or adjusted under 35 U.S.C. 154(b) by 0 days.

(21) Appl. No.: 10/018,124

(22) PCT Filed: Jun. 14, 2000

(86) PCT No.: PCT/GB00/02158
§ 371 (c)(1),
(2), (4) Date: May 12, 2002

(87) PCT Pub. No.: WO00/76889
PCT Pub. Date: Dec. 21, 2000

(30) Foreign Application Priority Data

Jun. 16, 1999 (GB) .............................................. 9913909

(51) Int. Cl.$^7$ .............................................. B63B 27/00
(52) U.S. Cl. .............................. 414/137.1; 414/137.9; 406/146; 406/197; 175/206
(58) Field of Search .................................. 406/121, 146, 406/197; 175/206; 414/137.1, 137.6, 137.9, 139.4

(56) References Cited

U.S. PATENT DOCUMENTS

| 599,702 A | 3/1898 | Griswold |
|---|---|---|
| 1,127,660 A | 2/1915 | McMichael |
| 1,309,671 A | 7/1919 | Weaver |
| 1,347,358 A | 7/1920 | Adams et al. |
| 1,782,681 A | 11/1930 | Foss et al. |
| 1,983,185 A | 12/1934 | Novak |
| 2,073,982 A | 3/1937 | Woodruff |
| 2,115,023 A | 4/1938 | Kennedy et al. |
| 2,380,651 A | 7/1945 | Jeffery |
| 2,599,235 A | 6/1952 | Coney |
| 2,612,297 A | 9/1952 | Bain |
| 2,753,220 A | 7/1956 | Kemper |
| 3,001,829 A | 9/1961 | De Saint-Martin |
| 3,136,456 A | 6/1964 | Sherbondy |
| 3,195,960 A | 7/1965 | Trythall |
| 3,197,259 A | 7/1965 | Braun-Angott |
| 3,258,176 A | 6/1966 | Raczynski |
| 3,272,393 A | 9/1966 | Roeser |
| 3,281,019 A | 10/1966 | Curry |
| 3,362,487 A | 1/1968 | Lindsey |
| 3,363,404 A | 1/1968 | Griffin, III et al. |
| 3,369,716 A | 2/1968 | Hulbert, Jr. |
| 3,501,061 A | 3/1970 | Hermanns |
| 3,568,865 A | 3/1971 | Willmroth |
| 3,586,383 A | 6/1971 | Trythall |
| 3,773,230 A | 11/1973 | Murfitt |
| 3,797,707 A | 3/1974 | Jenike et al. |
| 3,809,436 A | 5/1974 | Claffone |
| 3,811,518 A | 5/1974 | Kalaf et al. |

(List continued on next page.)

FOREIGN PATENT DOCUMENTS

| CA | 1-291192 | 10/1991 |
|---|---|---|
| DE | 1013222 | 8/1957 |
| DE | 1031215 | 5/1958 |
| DE | 1121997 | 1/1962 |
| DE | 1128809 | 4/1962 |
| DE | 1277119 | 9/1968 |
| DE | 1296097 | 5/1969 |

(List continued on next page.)

OTHER PUBLICATIONS

Marks' Standard Handbook for Mechanical Engineers, Tenth Edition, "Carrying Conveyors" (Cover page, pp. 10–53 and 10–54) (3 pages).

*Primary Examiner*—Joseph A. Dillon, Jr.
(74) *Attorney, Agent, or Firm*—Jones Day

(57) ABSTRACT

A method for transporting oil drill cuttings using a vessel having a lower conical portion where the cone has an angle which provides for mass flow of the drill cuttings when there is an application of compressed air on the surface of the drill cuttings in the vessel.

30 Claims, 10 Drawing Sheets

U.S. PATENT DOCUMENTS

| | | |
|---|---|---|
| 3,921,858 A | 11/1975 | Bemm |
| 3,955,717 A | 5/1976 | Landau |
| 3,964,557 A | 6/1976 | Juykam-Wold |
| 4,036,099 A | 7/1977 | French |
| 4,059,195 A | 11/1977 | MacDonald et al. |
| 4,059,311 A | 11/1977 | Spitzer et al. |
| 4,073,244 A | 2/1978 | Snowdon |
| 4,098,541 A | 7/1978 | Côté |
| 4,101,175 A | 7/1978 | Kull |
| 4,113,151 A | 9/1978 | Brown et al. |
| 4,137,935 A | 2/1979 | Snowdon |
| 4,174,868 A | 11/1979 | De Nardo |
| 4,175,039 A | 11/1979 | Fisher |
| 4,209,381 A | 6/1980 | Kelly, Jr. |
| 4,242,146 A | 12/1980 | Kelly, Jr. |
| 4,355,929 A | 10/1982 | Snowdon |
| 4,439,069 A | 3/1984 | Kelly, Jr. et al. |
| 4,451,184 A | 5/1984 | Mitchell |
| 4,515,503 A | 5/1985 | Snowdon |
| 4,525,282 A * | 6/1985 | Bartsch et al. .............. 210/747 |
| 4,526,121 A * | 7/1985 | Shudo et al. ................. 114/73 |
| 4,645,608 A | 2/1987 | Rayborn |
| 4,662,799 A | 5/1987 | Paul et al. |
| 4,671,431 A | 6/1987 | Obrist |
| 4,683,963 A | 8/1987 | Skinner |
| 4,696,353 A | 9/1987 | Elmquist et al. |
| 4,699,548 A | 10/1987 | Bergstrom |
| 4,747,961 A | 5/1988 | Beer et al. |
| 4,793,423 A | 12/1988 | Knol |
| 4,823,989 A | 4/1989 | Nilsson |
| 4,834,587 A | 5/1989 | Crawley et al. |
| 4,836,302 A | 6/1989 | Heilhecker et al. |
| 4,872,949 A | 10/1989 | Wilwerding |
| 4,913,245 A | 4/1990 | Skinner |
| 4,942,929 A | 7/1990 | Malachosky et al. |
| 5,012,957 A | 5/1991 | Mihail |
| 5,109,933 A | 5/1992 | Jackson |
| 5,125,540 A | 6/1992 | Rodriguez |
| 5,129,468 A | 7/1992 | Parmenter |
| 5,129,469 A | 7/1992 | Jackson |
| 5,150,666 A | 9/1992 | Momont et al. |
| 5,213,446 A | 5/1993 | Dovan |
| 5,226,575 A | 7/1993 | Faust |
| 5,226,749 A | 7/1993 | Perkins |
| 5,303,786 A | 4/1994 | Prestridge et al. |
| 5,310,285 A | 5/1994 | Northcott |
| 5,314,265 A | 5/1994 | Perkins et al. |
| 5,330,017 A | 7/1994 | Hart et al. |
| 5,339,912 A | 8/1994 | Hosie et al. |
| 5,341,882 A | 8/1994 | Hale |
| 5,356,034 A | 10/1994 | Schlumberger |
| 5,402,857 A | 4/1995 | Dietzen |
| 5,405,223 A | 4/1995 | Sirevag |
| 5,454,957 A | 10/1995 | Roff, Jr. |
| 5,494,381 A | 2/1996 | Heyl et al. |
| 5,542,719 A | 8/1996 | Nordin |
| 5,556,238 A | 9/1996 | Chinh |
| 5,564,509 A | 10/1996 | Dietzen |
| 5,570,749 A | 11/1996 | Reed |
| 5,584,416 A | 12/1996 | Florian |
| 5,589,603 A | 12/1996 | Alexander et al. |
| 5,618,136 A | 4/1997 | Smoot |
| 5,686,685 A | 11/1997 | McDonald et al. |
| 5,725,021 A | 3/1998 | Dallas |
| 5,755,892 A | 5/1998 | Herold et al. |
| 5,816,450 A | 10/1998 | Alexander et al. |
| 5,839,521 A | 11/1998 | Dietzen |
| 5,842,529 A | 12/1998 | Dietzen |
| 5,863,430 A | 1/1999 | Williams |
| 5,913,372 A | 6/1999 | Dietzen |
| 5,928,519 A | 7/1999 | Homan |
| 5,964,304 A | 10/1999 | Morrison |
| 5,971,084 A | 10/1999 | Dietzen |
| 5,996,484 A | 12/1999 | Reddoch |
| 6,009,959 A | 1/2000 | Dietzen |
| 6,085,939 A | 7/2000 | Geweke et al. |
| 6,152,656 A * | 11/2000 | Curtis et al. .................. 406/34 |
| 6,170,580 B1 | 1/2001 | Reddoch |
| 6,179,070 B1 | 1/2001 | Dietzen |
| 6,179,071 B1 | 1/2001 | Dietzen |
| 6,213,227 B1 | 4/2001 | Dietzen |
| 6,224,534 B1 | 5/2001 | Limia et al. |
| 6,234,258 B1 | 5/2001 | Karigan |
| 6,279,471 B1 | 8/2001 | Reddoch |
| 6,325,572 B1 * | 12/2001 | Dietrich ...................... 406/171 |
| 6,328,118 B1 | 12/2001 | Karigan et al. |
| 6,345,672 B1 | 2/2002 | Dietzen |
| 6,368,029 B1 * | 4/2002 | d'Aquin ..................... 406/197 |
| 6,443,613 B1 * | 9/2002 | Rumph ....................... 366/348 |
| 6,453,584 B1 | 9/2002 | Buckner |
| 6,530,438 B1 * | 3/2003 | McIntyre ..................... 175/66 |

FOREIGN PATENT DOCUMENTS

| | | |
|---|---|---|
| DE | 2328496 | 1/1975 |
| DE | 2616430 | 11/1976 |
| DE | 2755671 | 6/1979 |
| DE | 2922453 | 12/1980 |
| DE | 3012065 | 10/1981 |
| DE | 3233099 | 3/1984 |
| DE | 3303542 | 8/1984 |
| DE | 3333433 | 3/1985 |
| DE | 3410244 | 10/1985 |
| DE | 3439251 | 4/1986 |
| DE | 4007430 | 9/1991 |
| DE | 4010676 | 10/1991 |
| EP | 0060137 | 9/1982 |
| EP | 0140570 | 5/1985 |
| EP | 0060136 | 5/1988 |
| EP | 0223589 | 7/1991 |
| EP | 0630839 | 12/1994 |
| EP | 0787671 | 8/1997 |
| FR | 642010 | 8/1928 |
| FR | 979085 | 4/1951 |
| FR | 1154954 | 4/1958 |
| FR | 1184961 | 7/1959 |
| FR | 1285957 | 1/1962 |
| FR | 1295567 | 5/1962 |
| FR | 1349001 | 12/1963 |
| FR | 1382944 | 11/1964 |
| FR | 1396528 | 3/1965 |
| FR | 1477357 | 3/1967 |
| FR | 1507659 | 11/1967 |
| FR | 1551795 | 11/1968 |
| FR | 2237819 | 2/1975 |
| GB | 419756 | 11/1934 |
| GB | 671111 | 4/1952 |
| GB | 770377 | 3/1957 |
| GB | 779479 | 7/1957 |
| GB | 1094080 | 12/1967 |
| GB | 1151246 | 5/1969 |
| GB | 1172575 | 12/1969 |
| GB | 1216009 | 12/1970 |
| GB | 1216506 | 12/1970 |
| GB | 1216507 | 12/1970 |
| GB | 1386710 | 3/1975 |
| GB | 1426035 | 2/1976 |
| GB | 1564311 | 4/1980 |
| GB | 1595065 | 8/1981 |
| GB | 2147397 | 5/1985 |
| GB | 2183210 | 6/1987 |
| GB | 2279429 | 1/1995 |
| JP | 0214519 | 8/1989 |
| SU | 1751121 | 7/1992 |
| WO | WO 82/00992 | 4/1982 |
| WO | WO 90/08712 | 8/1990 |
| WO | WO 95/0426 | 1/1995 |

* cited by examiner

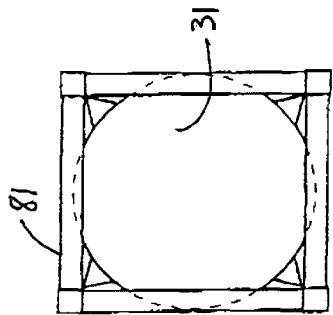
Fig. 7B
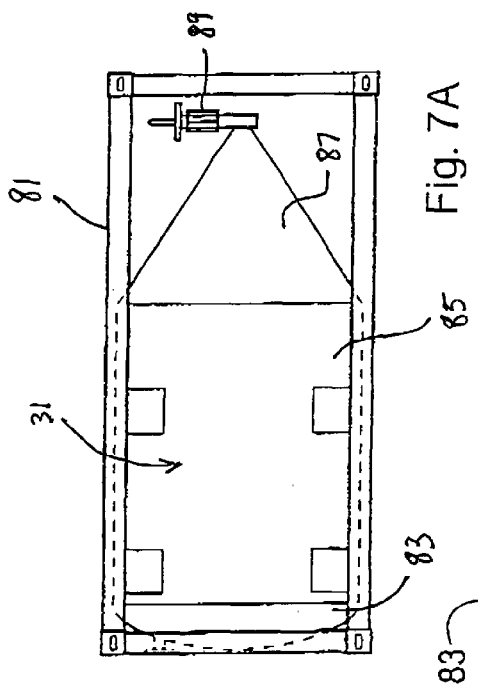
Fig. 7A
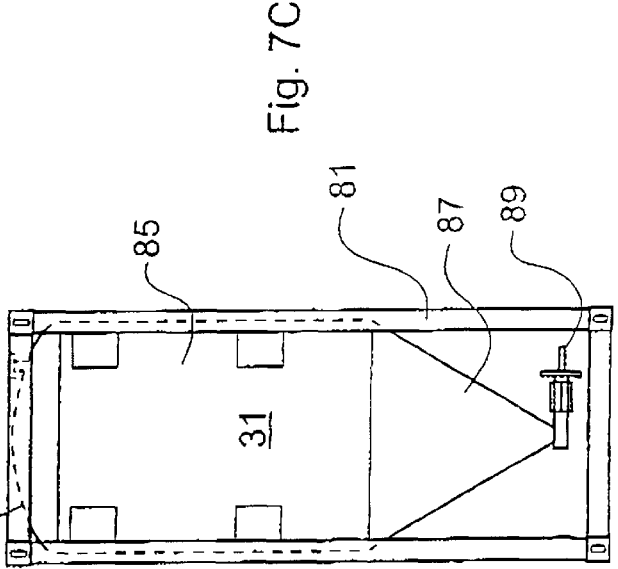
Fig. 7C
Fig. 7

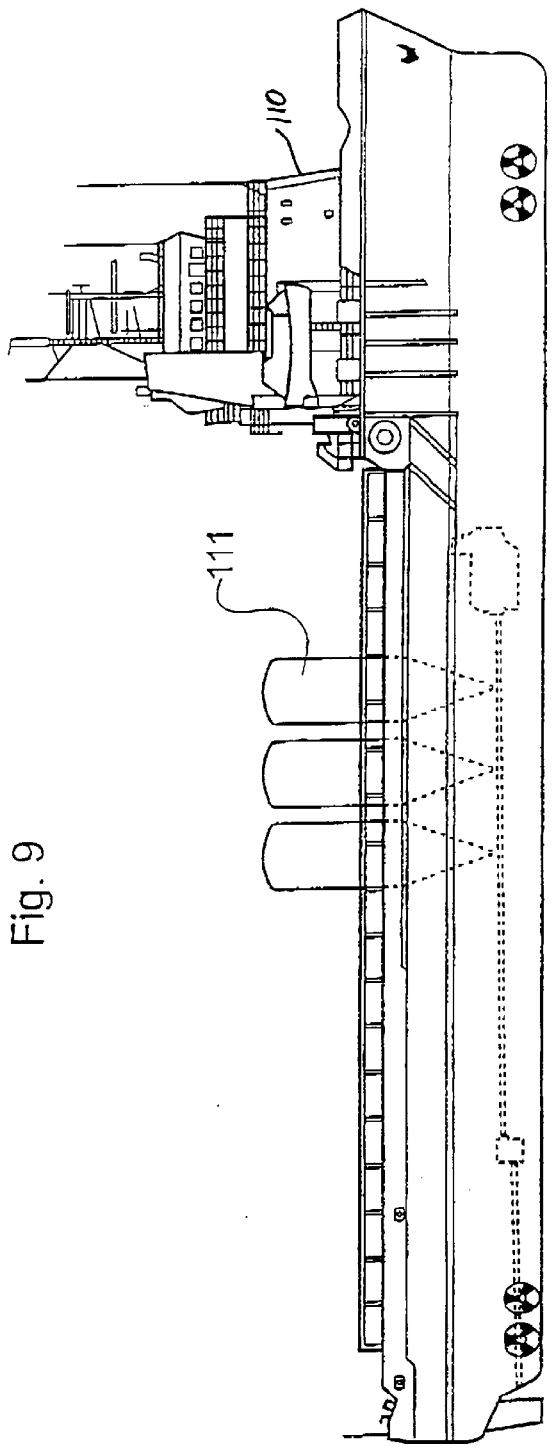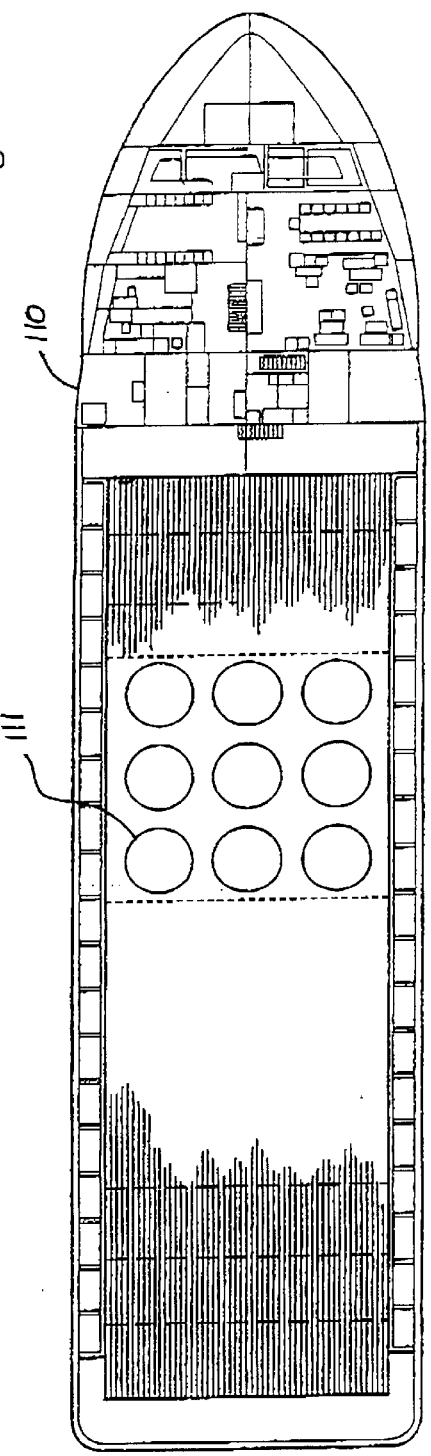

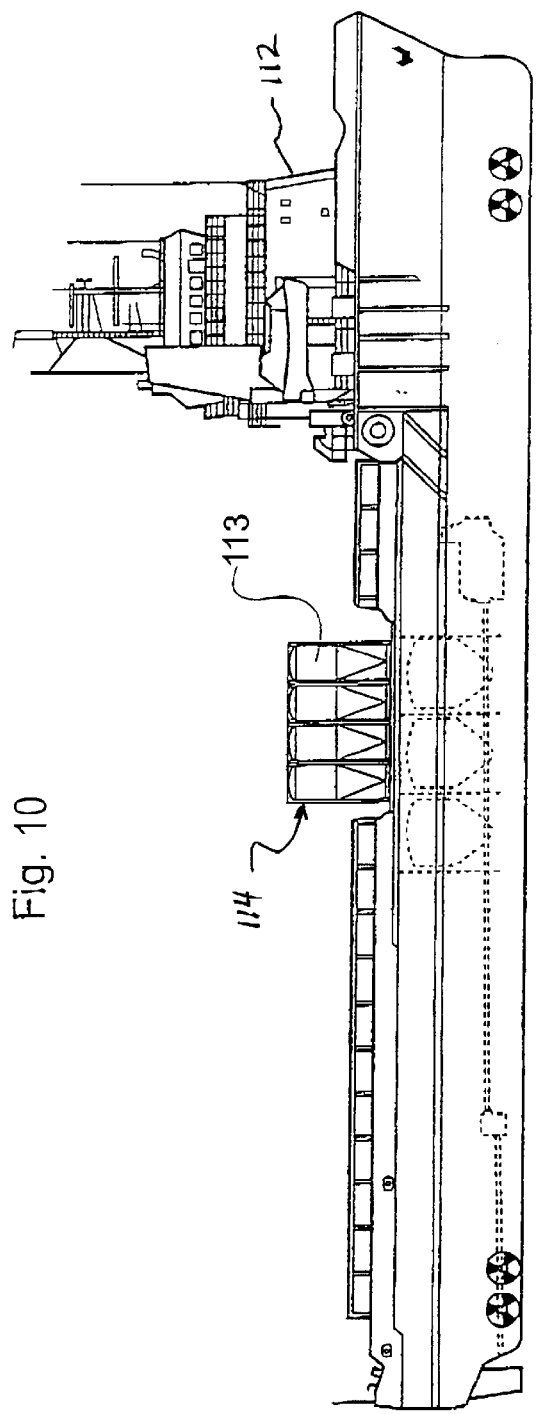
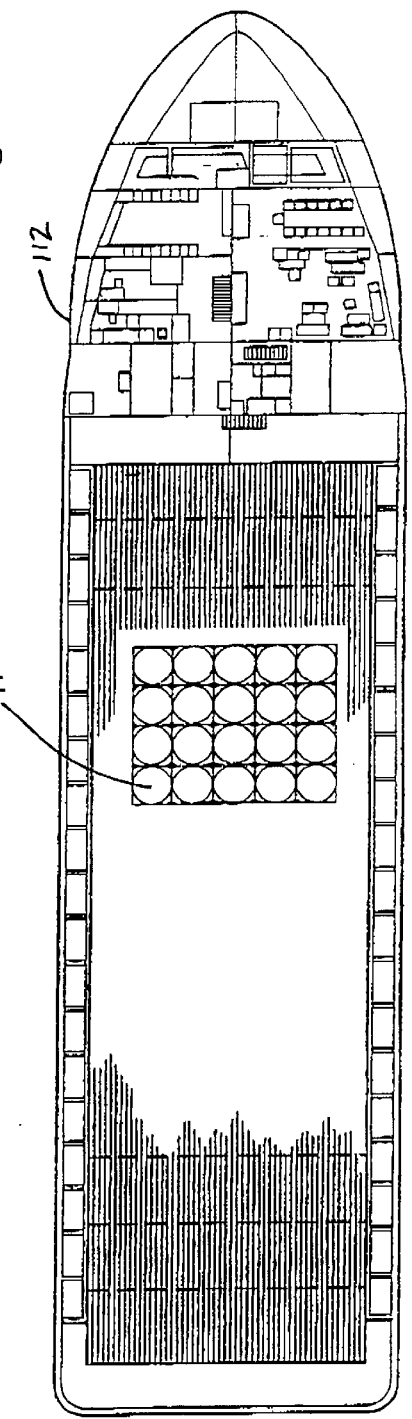
Fig. 10
Fig. 10A
Fig. 10 B

METHOD OF PNEUMATICALLY CONVEYING NON-FREE FLOWING PASTE

This invention relates to pneumatic conveying and, in particular, to the conveying of materials which are in the form of thick heavy pastes which are normally difficult to move and handle.

An example of the sort of material with which this invention is concerned is provided by the oil exploration industry. When oil wells are drilled, the cuttings from the drilling operations are brought up onto the drilling platform. For a large part of the drilling operation, a special type of oil is pumped down to the drilling bits as a lubricant. The oil contaminated material which comes up onto the drilling platform has until recently been dumped into the sea. For environmental reasons, such disposal is no longer permitted and the material now has to be transported to the shore for processing.

On the drilling rig, the oil contaminated cuttings are screened to remove a high proportion of the oil for re-use on the rig. The cuttings, which are still contaminated with some oil, are transported ashore in the form of a very thick heavy paste. Typically the material is put into special skips of about 10 ton capacity which are loaded by crane from the rig onto supply boats. This is a difficult and dangerous operation in bad weather and is laborious and expensive.

We have now surprisingly found a novel method of transferring thick heavy pastes material e.g. drill cuttings which has not been previously possible.

Accordingly, the present invention is based on surprising discovery that it is possible to transport a material in the form of a thick heavy paste by means of pneumatic conveying from a relatively large vessel Hitherto, it has been supposed that pneumatic conveying systems were only suitable for relatively free flowing material or conveying of small batches of wet sticky materials.

Thus, according to the present invention there is provided a method of conveying a non-free flowing paste comprising loading the paste into a vessel and applying a compressed gas to the vessel to cause the material to flow out of the vessel.

The non-free flowing paste may be a thick and/or heavy paste or clay like material, e.g. oil rig drill cuttings.

The vessel is preferably transportable and is a combined storage and pneumatic conveying vessel.

The compressed gas is preferably compressed air, because it is relatively inexpensive although in certain instances an inert gas may be used, for example, compressed nitrogen.

The vessel is provided with an inlet and an outlet such that loading of the vessel is via the inlet. Preferentially the outlet is connected to a conduit which leads to a desired destination of the material.

In a preferred embodiment the method of the invention also includes the step of transporting the vessel, having at least partially filled it with said material, from its filling station to a discharge station. At the discharge station, compressed air is applied to the interior of the vessel to convey the material out of the vessel to its destination.

Preferably the vessel includes a conical hopper portion which, at least during discharge of the material, forms the lower section of the vessel. In a further preferred embodiment, the lower conical hopper portion is the outlet end of the vessel.

Because of the nature of the material being handled in the method of the present invention, there is a tendency for the flow of the material out of the vessel to be less than complete. This is because the type of flow which occurs during discharge is of a form known as core flow or funnel flow. When this type of flow occurs, the material directly above the outlet falls through the outlet, e.g. the outlet valve, so that a falling core of material is created directly above the outlet. However, with sticky materials, the material around this core does not move. As the core falls, a depression occurs in the top surface of the material and the material surrounding that depression falls into the core. In the case of a sticky material there is a tendency for material around the core to remain in the vessel.

It has been discovered that even for the sort of material with which this invention is concerned, it is possible to change the nature of the flow out of the vessel by altering the cone angle of the lower conical portion of the vessel. If the included cone angle is changed below a certain or critical value, then the flow changes from core flow to so-called mass flow. In the case of mass flow, the material descends as a mass in a uniform way towards the outlet with all the material moving. Accordingly the combination of the use of a vessel designed to achieve mass flow and the application of a compressed gas above the surface of the material is such that it is possible to push the contents of the vessel through the outlet so as fully to empty the vessel.

It is well known that the critical cone angle will vary depending upon the material being conveyed as such would be well understood by those skilled in the art.

The pressure used in the vessel in the method may also vary depending upon the nature of the material. However, we have found that a pressure of between 4 and 8 bar is suitable.

In an embodiment of the present invention the drill cuttings are loaded into a first relatively small vessel capable of being pressurised from which said material is fed under pressure via a pipe to one or more further vessels also capable of being pressurised. Said further vessels may be transported to a position where discharge of material takes place or said further vessels may remain in their original position and the material is discharged from them into yet further vessels which are themselves transported to the destination.

An apparatus for conveying a material in the form of a thick, heavy paste, may include a vessel capable of being pressurised by compressed gas, the vessel having a material inlet, a material outlet and a pipe connected to the material outlet, means for loading the material into the vessel through the inlet, and gas supply means for supplying compressed gas to the vessel to cause the material to flow out of the vessel via the outlet and along the pipe.

Conventionally known pressure vessels are expected to withstand a maximum pressure of 2 bar. In a preferred embodiment the apparatus includes a vessel adapted to be pressurised by compressed gas to between 4 and 8 bar.

BRIEF DESCRIPTION OF THE DRAWINGS

FIG. 7 shows details of a standard ISO container sized vessel in plan and elevation views which may be used in the methods of the present invention;

FIG. 9 shows an oil rig supply boat in elevation and plan views including vessels which may be used in a method of the present invention;

FIG. 10 is an alternative embodiment of an oil rig supply boat in elevation and plan views including vessels of use in a method of the present invention.

DETAILED DESCRIPTION OF THE INVENTION

Embodiments of the present invention will now be described, by way of examples only, and with reference to the accompanying drawings.

Figure 1:
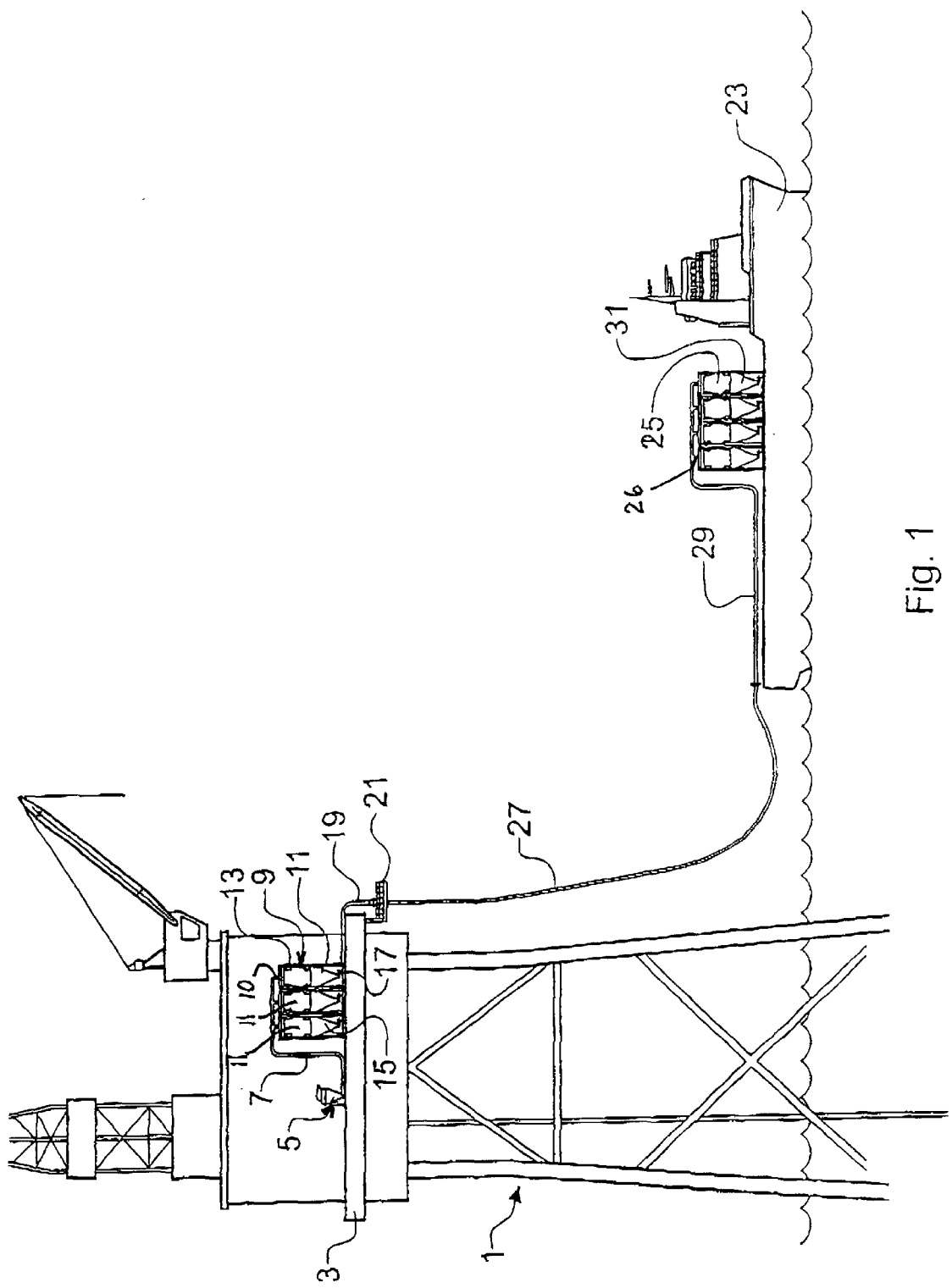
FIG. 1 is a diagrammatic elevation view showing the operation of a first method in accordance with the present invention.

Referring to FIG. 1 of the accompanying drawings, an off shore oil rig 1 has located on its platform 3 a pressure vessel 5 into which is loaded the screened drill cuttings arising from the drilling process. This pressure vessel 5 includes an upper material inlet, a lower conical portion 6 and a lower material outlet as well as means for supplying compressed air to the interior of the vessel, all as described in detail below in relation to similar vessels. The material inlet includes a valve assembly similar to that described in GB-A-1539079 and the entire vessel may be similar to that manufactured and sold by Clyde Materials Handling Limited (Clyde).

In operation the pneumatic conveying system, including the pressure vessel 5, follows a cycle of filling and discharging material from the pressure vessel. At the start of the cycle, the material inlet valve (in the Clyde system this valve includes a part spherical closure member) is closed. A vent valve is opened to equalise vessel pressure to ambient air. The inlet valve is opened and the oil cuttings/oil mixture is fed into the pressurised vessel. The vent valve is opened to vent displaced air from the vessel. When the pressurised vessel is full, the inlet valve closes. The vent valve also closes and the vessel is now sealed. An air inlet valve is opened and the material is conveyed in the form of a semi solid slug along pipe 7.

As indicated in FIG. 1, a pipe 7 extends from a position below the pressurised vessel 5 to an elevated position above a container assembly 9. The assembly 9 comprises three ISO container sized vessels 11 located within a support framework 13. (In other embodiments, the container assembly may include a number of vessels 11 other than three). The pipe 7 extends above the top of the container assembly 9 and has downwardly extending branches 10 leading into the inlets of each of the containers 11.

Each container 11 has a lower conical shaped hopper portion 15 and at the lowermost point of this portion there is a valve outlet 17 whereby the material within the containers 11 may be discharged via a pipe 19 to a connector 21.

A supply boat 23, fitted with a further container assembly 25, may be brought close to the oil rig 1. A flexible hose 27 is connected to the pipe 19 at the connector 21. At its other end the hose 27 is connected to a filling pipe 29 located on the boat 23. The filling pipe 29 leads from the rear of the boat 23 to a position above the container assembly 25 and branch pipes 26 extend downwardly from the pipe 29 to the inlets of each of the containers 31 forming a part of the container assembly 25.

Figure 2:
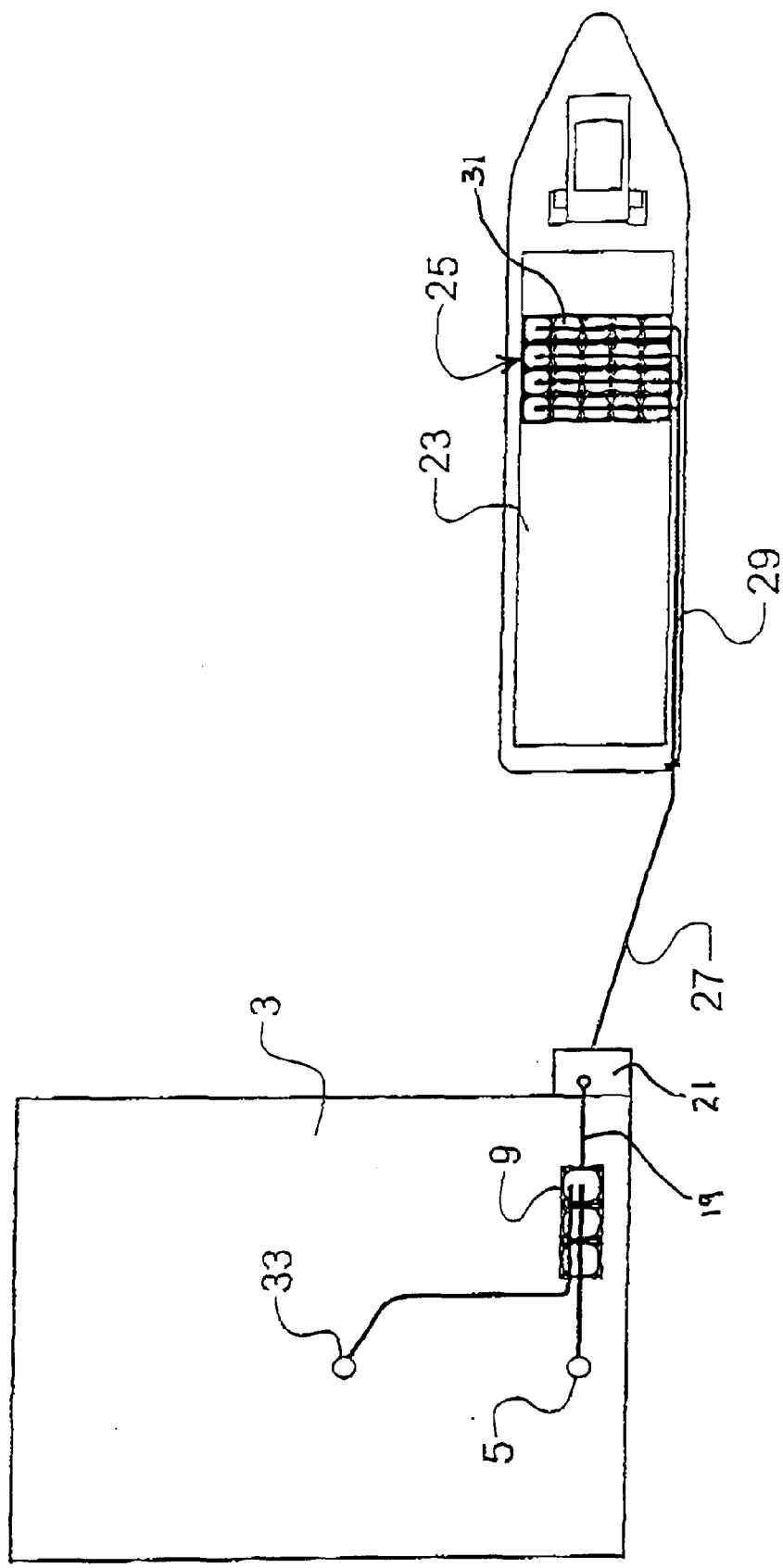
FIG. 2 is a diagrammatic plan view of FIG. 1.

As illustrated in FIG. 2, there may be further pressure vessels such as the vessel 33 for feeding the drill cuttings/oil mixture to the container assembly 9.

Figure 3:
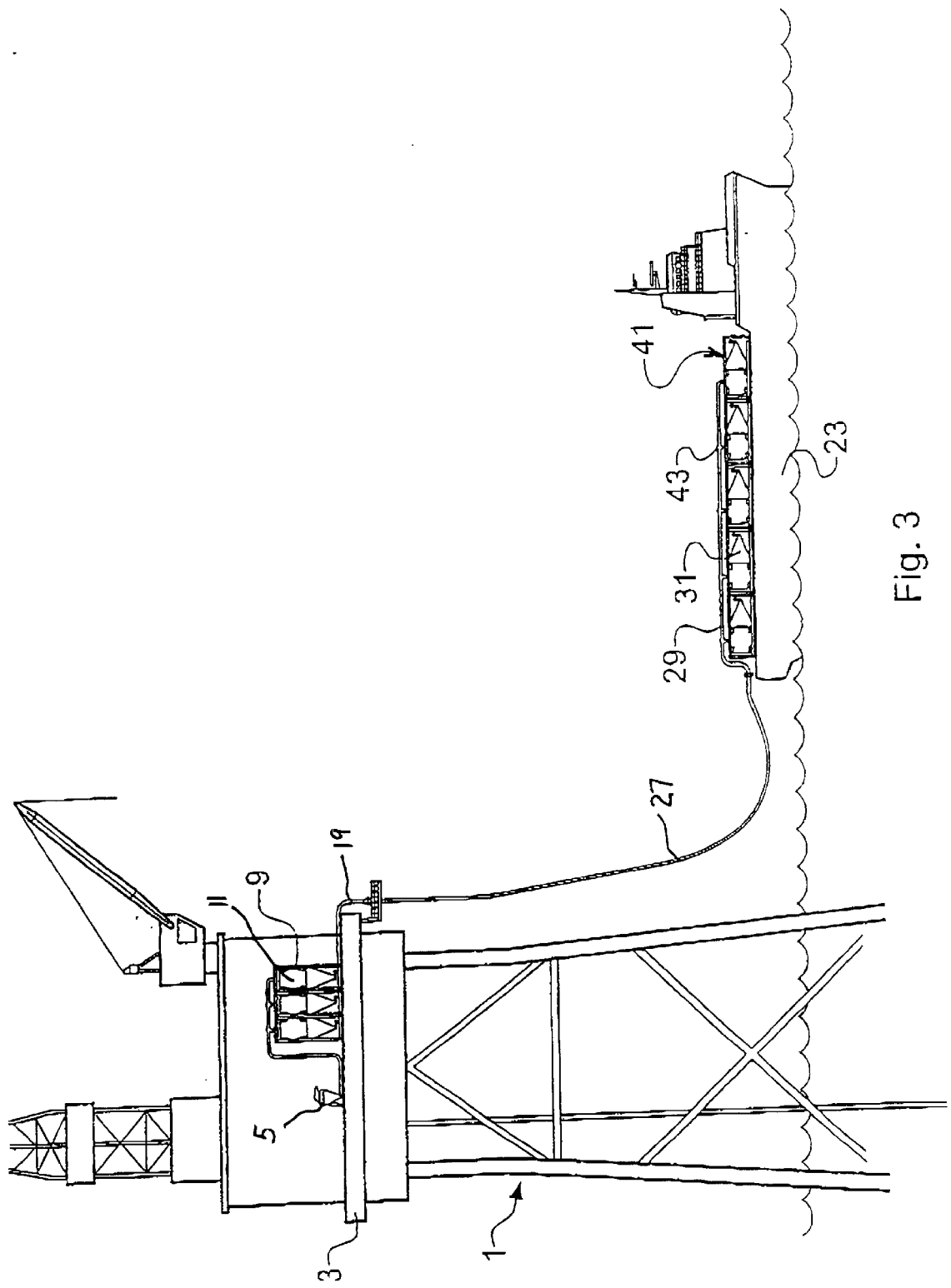
FIG. 3 is a diagrammatic elevation view showing the operation of a second method in accordance with the present invention.
Figure 4:
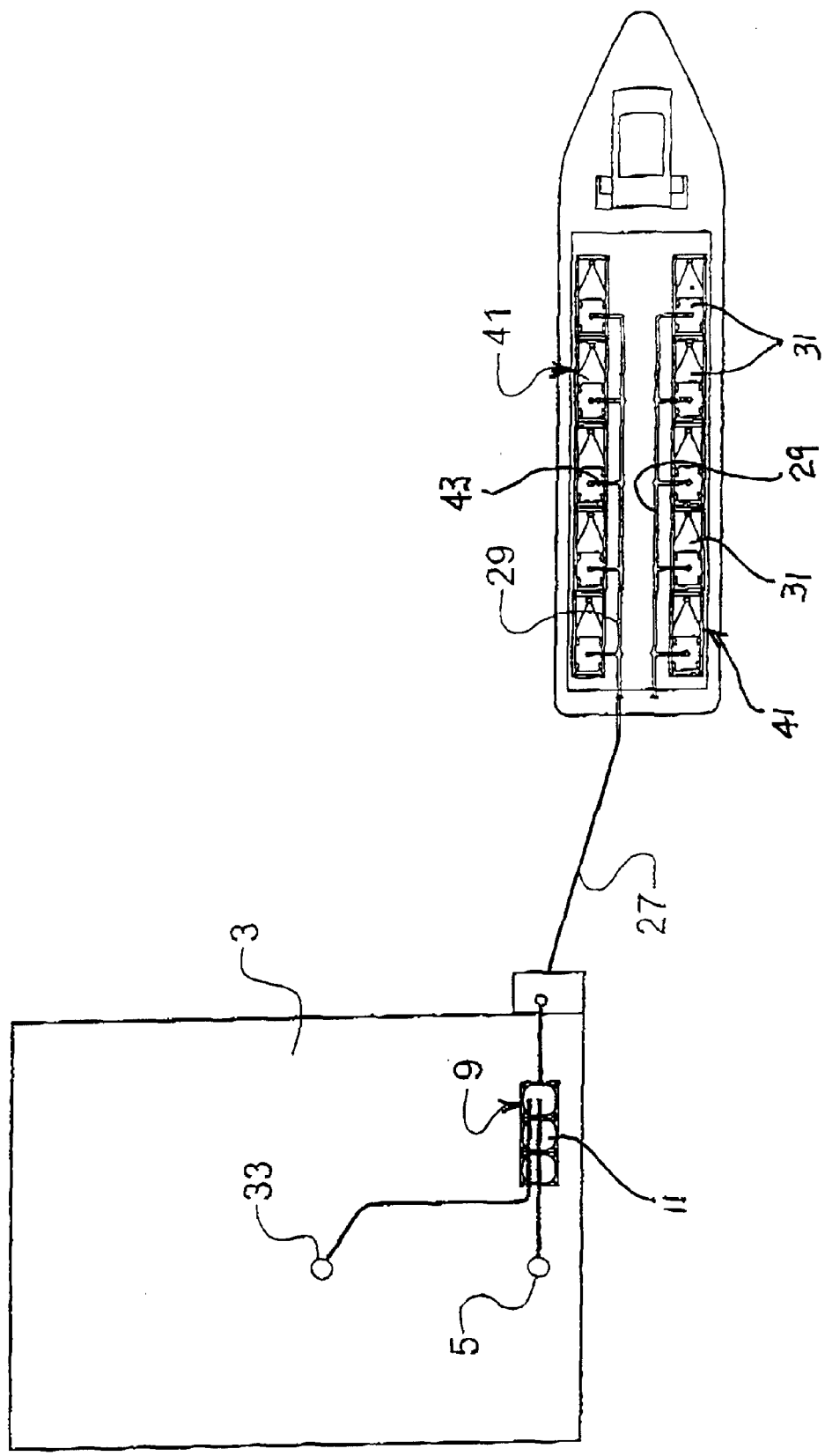
FIG. 4 is a diagrammatic plan view of FIG. 3.

Referring to FIGS. 3 and 4 of the accompanying drawings, there is illustrated an arrangement broadly similar to that described above with reference to FIGS. 1 and 2. As described, the drill cuttings/oil mixture is fed from the container assembly 9 located on the oil rig platform 3 to the boat 23. A container assembly 41 is located on the boat 23, however, the containers 31 in this container assembly are arranged with their longitudinal axes extending horizontally rather than vertically as in the case of the FIG. 1 embodiment. The feed pipe 29 again extends to a position above the container assembly 41 and has branch pipes 43 extending downwardly into inlets located in the side of each container.

As better shown in FIG. 4, there are in fact two container assemblies 41, each of which is provided with a feed pipe 29 which may be connected to the flexible hose 27.

Figure 5:
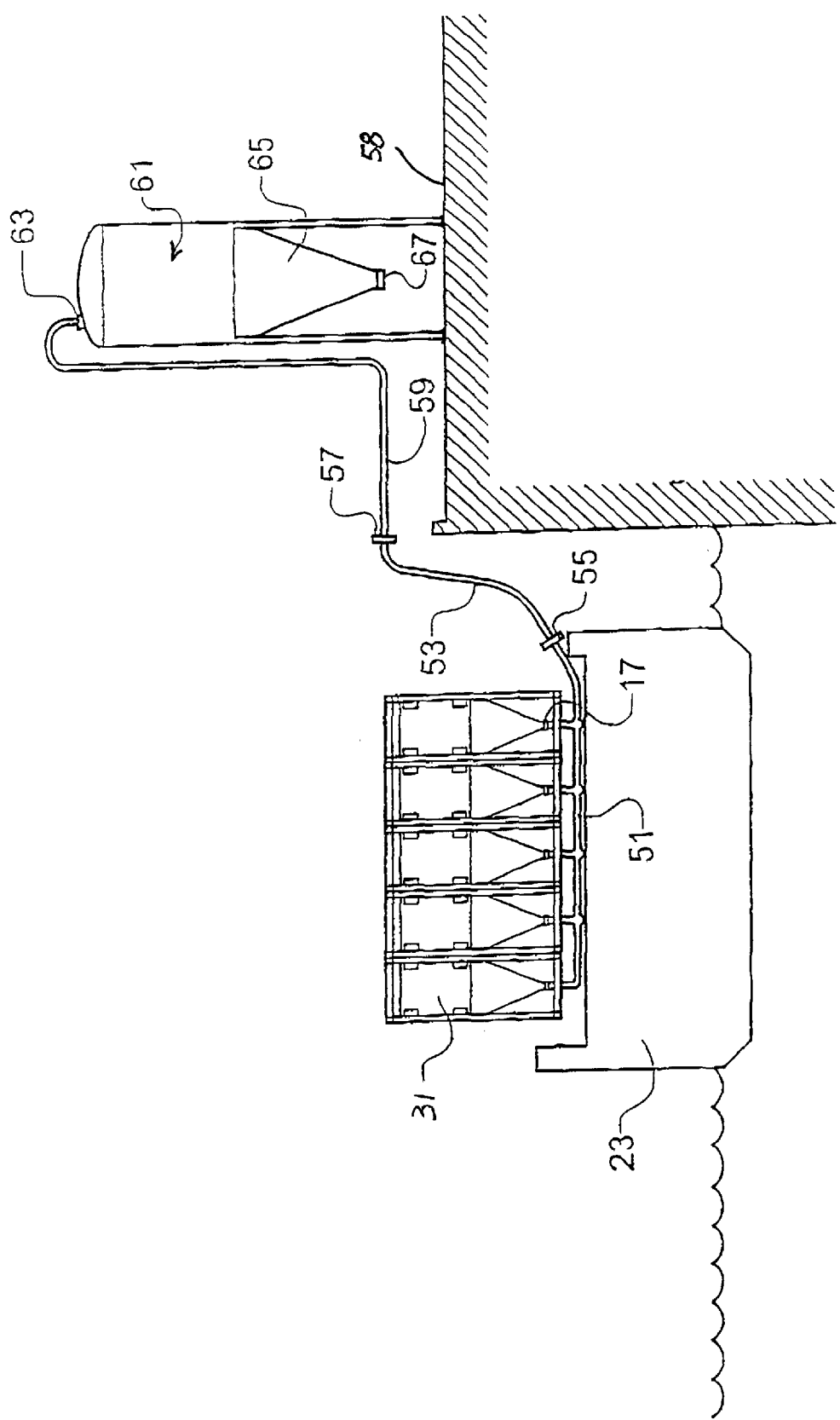
FIG. 5 is a diagrammatic elevation view showing a continuation of the operation of the methods illustrated in FIGS. 1–4.

What has been described in reference to FIGS. 1–4 may be considered a first stage in the method of the present invention. Following the loading of the containers 31 on the boat 23, the boat is moved to shore where the unloading process or next stage is carried out. A discharge pipe 51, FIG. 5, extends from the outlet 17 of each of the containers 31. The pipe 51 may be connected to a flexible hose 53 which extends from a connection 55 located on the ship 23 to a further connection 57 located on land 58. Extending from the connection 57 is a pipe 59 which leads to an elevated position above a large container 61. The pipe 59 is connected to an inlet 63 at the top of the container 61. The container 61 is broadly similar in shape to the containers 31 and has a lower conical shaped portion 65. When desired the material loaded into the container 61 may be discharged via lower outlet 67.

The process of feeding the drill cuttings/oil mixture from the containers 31 to the large container 61 involves pneumatic conveying similar to that described above in connection with the conveying of the material from the pressure vessel 5, FIG. 1, to the containers 11.

Figure 6:
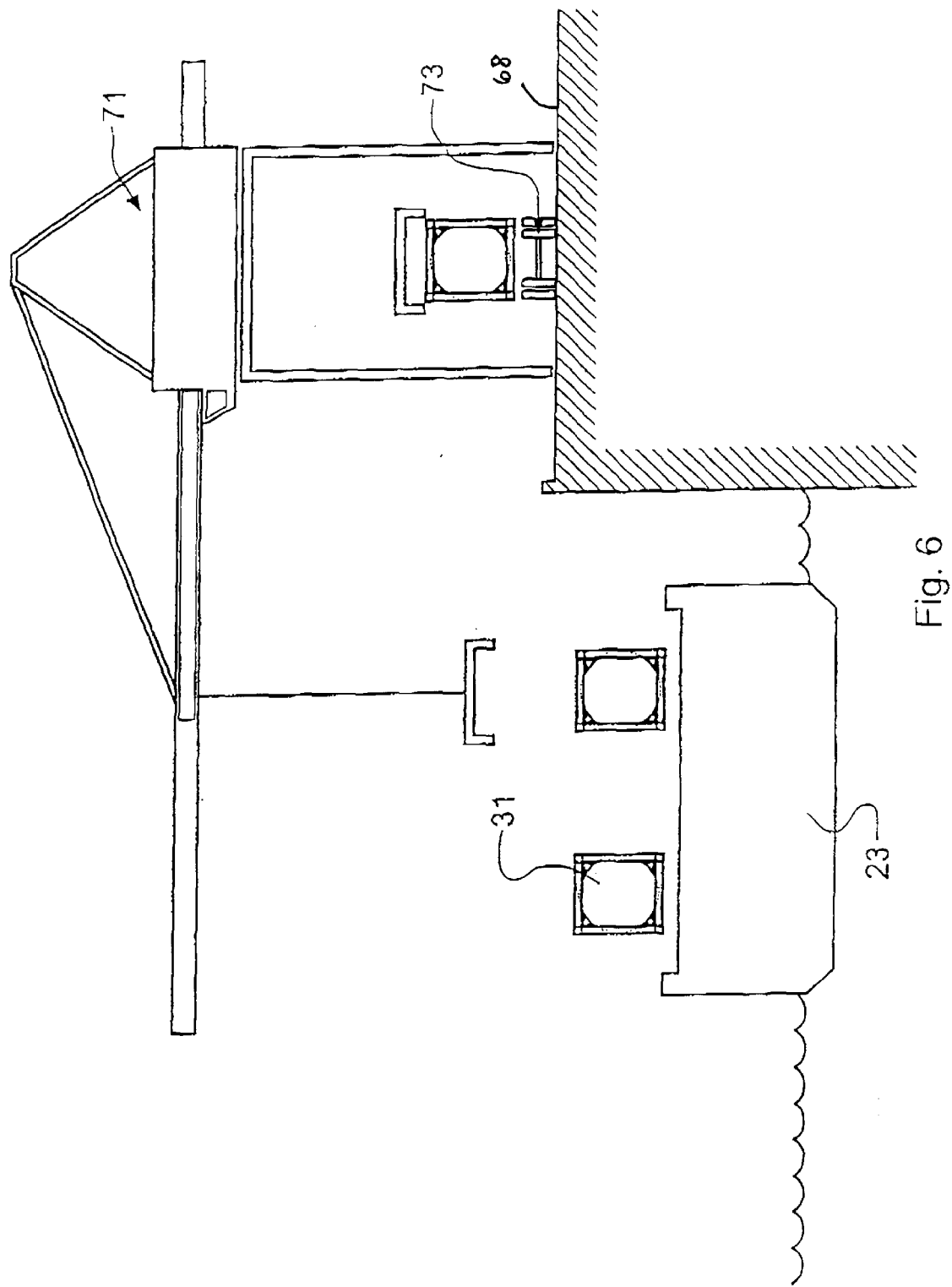
FIG. 6 is a diagrammatic elevation view showing an alterative continuation of the operation of the method of FIG. 3.

Referring to FIG. 6 of the accompanying drawings, there is illustrated another stage in the method described above with reference to FIGS. 1–4. The supply boat 23, having had its containers 31 loaded with material, moves from the oil rig 1 to the shore 68. When berthed, the containers 31 are raised by a crane 71 from the boat 23 onto a road vehicle 73.

Referring to FIG. 7 of the accompanying drawings, there is illustrated an ISO container sized conveying vessel 31 located within a support frame 81 and being positioned with its longitudinal axis arranged horizontally (FIGS. 7A and 7B) and with this axis lying vertically (FIG. 7C). The vessel 31 has a part spherical shaped upper end 83, a cylindrical main body section 85 and a lower conical section 87. At the lowermost or outer end of the conical section 87, the vessel is provided with a discharge valve 89. The vessels 11 are similarly constructed.

Figure 8:
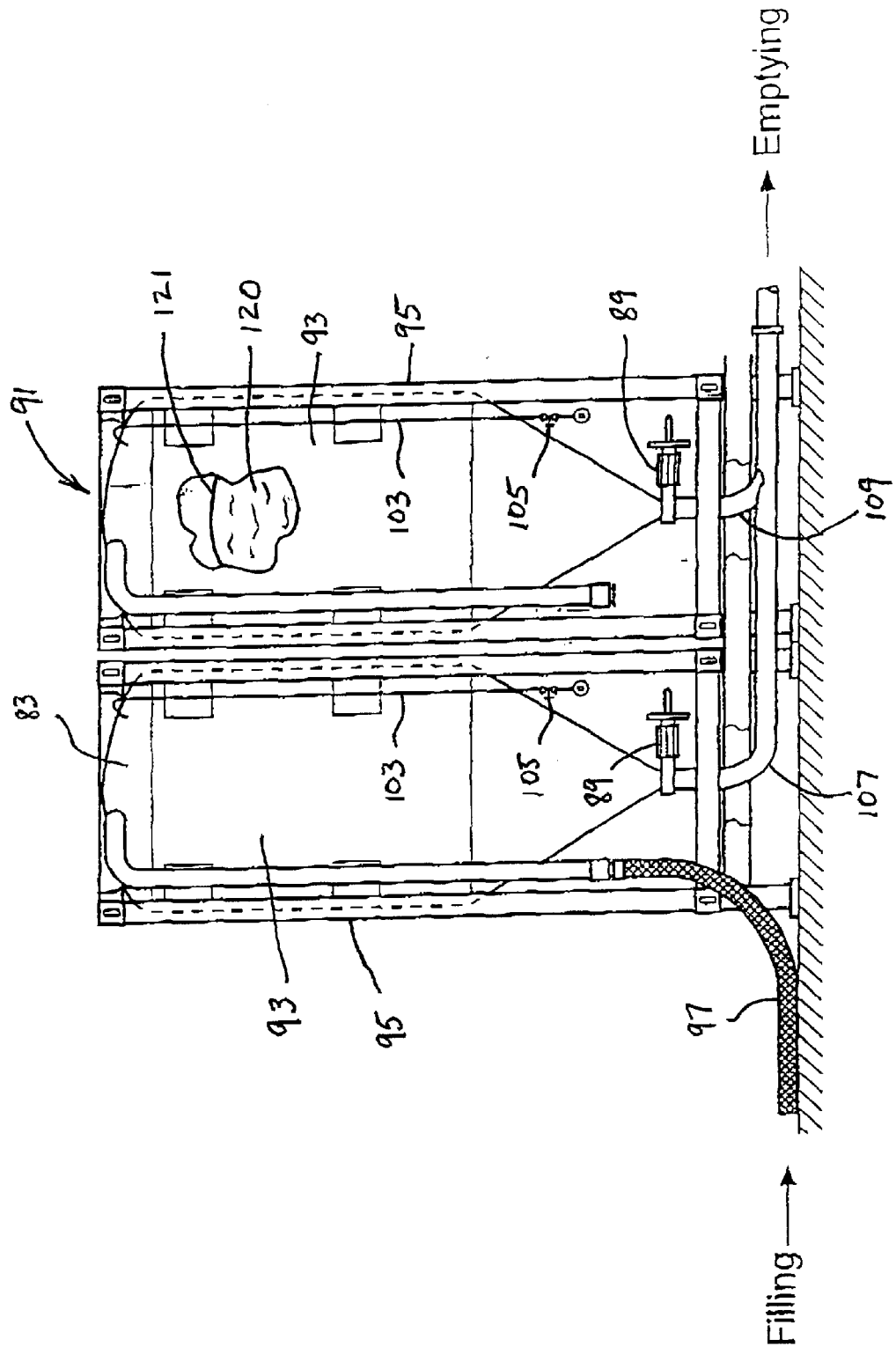
FIG. 8 shows a partially broken away assembly of two ISO container sized vessels in elevation view.

Referring to FIG. 8 of the accompanying drawings, there is illustrated a container assembly 91 comprising containers 93, each located with a support frame 95. A filling pipe 97 extends into each container via a valve 99 and, where appropriate includes a branch pipe (not shown), the container inlet being located in the upper end 83 of the container. Also extending into the upper end of each container 93 is a compressed air line 103 having valves 105. Any number of containers may be connected in this way with a common material filling pipe and a common material discharge pipe.

At the lower end of each container 93 is a discharge valve 89 having connected thereto a pipe 107 via, if appropriate, a branch pipe 109. In order to empty a vessel filled via the pipe 97, the valve 99 is closed, the valve 89 is opened and compressed air is fed to the vessel via the air line 103 after opening the valve 105. The drill cuttings/oil mixture is forced out of the vessel 93 under the pressure of the compressed air and into the pipe 107. Due to the conical angle of the conical or hopper section 93 being less than a certain value, the material flow out of the container 93 is of the type known as mass flow and results in all of the material exiting uniformly out of the container.

Also illustrated in FIG. 8, is the drill cuttings/oil mixture 120 in the vessel 93. (This is shown in a broken out portion of the right side vessel.) The drill cuttings/oil mixture includes an upper surface 121 upon which the compressed air operates during the time the drill cuttings/oil mixture is forced out of the vessel 93.

Referring to FIG. 9 of the accompanying drawings, there is illustrated in both elevation (FIG. 9A) and in plan (FIG. 9B) a supply boat 110 which is fitted with large conveying vessels 111 which extend through the deck of the boat. This arrangement can hold up to a thousand tons of drill cuttings/oil mixture and this mixture can be pumped pneumatically from the tanks onto shore based storage containers. The conveying vessels 111 have a cone angle such that mass flow occurs and they work in a similar way to the assembly of FIG. 8.

Referring to FIG. 10 of the accompanying drawings, there is shown another embodiment of a supply boat 112 illustrated in elevation (FIG. 10A) and in plan (FIG. 10B). In this case the boat is for conveying containers 113 which fit within the envelope of a 20 ft ISO container frame 114.

The use of ISO container vessels enables supply boats to be used in substantially unmodified form. Methods of the present invention involving the use of ISO container vessels may be operated in a different way.

In one embodiment in accordance with the present invention, a number of empty ISO container vessels is lifted onto the drilling rig by the rig crane. The vessels are stood on end on support frames incorporating the discharge piping and they are assembled into a line of storage vessels each of which can store about twenty tons of drill cuttings/oil. The pressurised vessel 5 (see FIG. 1) and/or the vessel 33 (see FIG. 2) is used to transfer the drill cuttings/oil from screens or centrifuges into the ISO conveying vessels 11. These vessels are then used to transfer the stored contents onto the supply boat as described above in connection with FIG. 1.

An advantage of this method is that there is a buffer storage on the rig so that drilling can occur when the supply boat is not present. Furthermore transfer rates from the rig are much higher than is possible if a standard pneumatic conveyor system (such as the Clyde system) is used alone. In addition hose sizes can be minimised.

An alternative embodiment making use of the ISO container vessels involves the use of these vessels on the supplied boat. Thirty or forty of these vessels may be stood on end and rafted together to form a stable structure into which 400 or 500 tons of cuttings can be conveyed, as illustrated in FIG. 10. When the vessel returns to port, the contents of the container vessels may be pneumatically transferred ashore. Alternatively, the tanks may be lifted off by cranes, turned horizontal and loaded onto standard ISO container road vehicles. If appropriate they could also be stacked on the quay side in the same way that containers are currently stacked. When the containers are received at the processing plant they are stood on end and used as conveying vessels to transfer the cuttings/oil into their destination.

In a further embodiment in accordance with the present invention the drill cuttings/oil mixture is stored in large volumes in the legs of semi-submersible oil rigs or drilling platforms. The legs are typically 15 m diameter. Pressurised vessels located in the legs and operating on the same principles as described above will store the cuttings/oil mixture and then be used as pneumatic conveying vessels to transfer the material onto the supply boat.

With some drill cuttings, it may be necessary or desirable to use low friction linings within the pressure vessels. Such linings may be used in conjunction with the use of the mass flow cone angle, as described above, to aid discharge of the drill cuttings from the internal surfaces of the pressure vessels.

What is claimed is:

1. A method for conveying a non-free flowing, heterogeneous, multicomponent, earth extracted paste comprising:
   loading said non-free flowing paste into a vessel;
   providing a compressed conveyance gas to the vessel as the sole means for inducing movement of said paste in said vessel; and
   upon provision of the compressed gas, discharging at least a portion of said non-free flowing paste from the vessel.

2. A method according to claim 1 wherein the compressed gas is compressed air.

3. A method according to claim 1 wherein the vessel is comprised of an inlet for loading the paste into the vessel and an outlet for flowing the paste out of the vessel.

4. A method according to claim 3 wherein the outlet has a generally conical shape.

5. A method according to claim 3 wherein the outlet is connected to a conduit which transports the paste to a desired destination.

6. A method according to claim 1 wherein the paste is comprised of oil drilling cuttings.

7. A method according to claim 1 wherein the vessel includes a conical hopper portion and wherein the conical hopper portion, at least during discharge of said paste, forms a lower portion of the vessel.

8. A method according to claim 7 wherein the outlet is located within the conical hopper portion of the vessel.

9. A method according to claim 8 wherein the conical hopper portion has a predetermined cone angle, wherein the cone angle allows for mass flow.

10. A method according to claim 1 wherein the compressed gas is applied to the surface of the paste.

11. A method according to claim 1 wherein the vessel is adapted to fit within an ISO container frame.

12. A method for conveying a non-free flowing, heterogeneous, multicomponent, earth extracted paste comprising:
   at least partially filling of a vessel with said non-free flowing paste;
   transporting the vessel to a discharge station;
   at the discharge station, providing a conveyance compressed gas to the vessel as the sole means for inducing movement of said paste in said vessel; and
   upon provision of the compressed gas, discharging at least a portion of said non-free flowing paste from the vessel.

13. A method according to claim 12 wherein the vessel is transported in a substantially horizontal position.

14. A method according to claim 13 wherein the vessel is rotated from a substantially horizontal position through at least 90° such that the vessel is in a substantially vertical position when the paste is discharged from the vessel.

15. A method for conveying a non-free flowing, heterogeneous, multicomponent, earth extracted paste comprising:

loading said non-free flowing paste into a first vessel;

providing a conveyance compressed gas to the first vessel as the sole means for inducing movement of said paste in said vessel;

upon provision of the compressed conveyance gas, discharging at least a portion of said non-free flowing paste from the first vessel into a conduit;

transferring the paste from said non-free flowing conduit into a second vessel;

providing a conveyance compressed gas to the second vessel; and upon provision of the compressed conveyance gas, discharging at least a portion of said non-free flowing paste from the second vessel.

16. A method according to claim 15 wherein the second vessel is transported to a discharge station and the paste is discharged from the second vessel at the discharge station.

17. A method according to claim 15 further comprising loading the paste discharged from the second vessel into a third vessel and transporting the third vessel to a desired destination.

18. A method for conveying a non-free flowing, heterogeneous, multicomponent, earth extracted paste comprising:

loading said non-free flowing paste into a vessel, wherein the vessel is adapted to withstand a pressure of about 4 bar to about 8 bar;

providing a compressed conveyance gas to the vessel as the sole means for inducing movement of said paste in said vessel; and upon provision of the compressed gas, discharging at least a portion of said non-free flowing paste from the vessel.

19. A method for conveying a non-free flowing, heterogeneous, multicomponent, earth extracted paste comprising:

at least partially filling of a vessel with said non-free flowing past, wherein the vessel is adapted to withstand a pressure of about 4 bar to about 8 bar;

transporting the vessel to a discharge station;

at the discharge station, providing a compressed conveyance gas to the vessel as the sole means for inducing movement of said paste in said vessel; and upon provision of the compressed conveyance gas, discharging at least a portion of said non-free flowing paste from the vessel.

20. A method for conveying a non-free flowing, heterogeneous, multicomponent, earth extracted paste comprising:

loading said non-free flowing paste into a first vessel, wherein the first vessel is adapted to withstand a pressure of about 4 bar to about 8 bar;

providing a compressed conveyance gas to the first vessel as the sole means for inducing movement of said paste in said first vessel;

upon provision of the compressed conveyance gas, discharging at least a portion of said non-free flowing paste from the first vessel into a conduit;

transferring said non-free flowing paste from the conduit into a second vessel, wherein the second vessel is adapted to withstand a pressure of about 4 bar to about 8 bar;

providing a compressed conveyance gas to the second vessel; and upon provision of the compressed gas, discharging at least a portion of said non-free flowing paste from the second vessel.

21. A process for conveying a non-free flowing, heterogeneous, multicomponent, earth extracted material comprising:

introducing said non-free flowing material into a vessel having a conical portion defining a cone angle selected to achieve mass flow of said non-free flowing material; and applying a compressed conveyance gas to said non-free flowing material in said vessel as the sole means for inducing movement of said material in said first vessel and to cause said non-free flowing material to flow out of said vessel.

22. The process as claimed in claim 21 including the step of:

evacuating said vessel to an enclosed conduit.

23. The process as claimed in claim 22 including the steps of:

transporting said non-free flowing material to a second vessel having a conical portion defining a cone angle selected to achieve mass flow of said non-free flowing material; and applying a compressed gas to said non-free flowing material in said second vessel to cause substantially complete evacuation of said non-free flowing material from said second vessel.

24. The process as claimed in claim 23 including the step of:

storing said non-free flowing material in said second vessel.

25. The process as claimed in claim 21 including the step of:

transporting said vessel before applying said compressed gas.

26. A method for conveying a non-free flowing, heterogeneous, multicomponent, earth extracted material comprising:

providing a vessel having a conical portion defining a cone angle selected to enable mass flow of said non-free flowing material;

introducing said non-free flowing material into said vessel;

applying a compressed conveyance gas to said non-free flowing material in said vessel as the sole means for inducing movement of said material in said first vessel and to cause said non-free flowing material to flow out of said vessel.

27. The method as claimed in claim 26 including the step of:

evacuating said vessel to a conduit.

28. The method as claimed in claim 27 including the steps of:

transporting said non-free flowing material to a second vessel having a conical portion defining a cone angle selected to enable mass flow of said non-free flowing material;

introducing said non-free flowing material into said second vessel; and applying a compressed gas to said non-free flowing material in said second vessel to cause substantially complete evacuation of said non-free flowing material from said second vessel.

29. The method as claimed in claim 28 including the step of:

storing said non-free flowing material in said second vessel.

30. The method as claimed in claim 26 including the step of:

transporting said vessel before applying said compressed gas.

* * * * *